T. CRANE,

Assignor to himself and M. A. JONES.

Sewing-Machine.

No. 9,208. Reissued May 18, 1880.

Witnesses

W. C. Corlies

Jno. C. MacGregor.

Inventor

Thomas Crane

By Coburn & Thacher

Attorneys

T. CRANE,

Assignor to himself and M. A. JONES.

Sewing-Machine.

No. 9,208. Reissued May 18, 1880.

Witnesses

W. C. Corlies

Jno. C. MacGregor

Inventor

Thomas Crane

By Johnson & Thacher

Attorneys

T. CRANE,

Assignor to himself and M. A. JONES.

Sewing-Machine.

No. 9,208. Reissued May 18, 1880.

Witnesses

W. C. Corlies

Jno. C. MacGregor.

Inventor

Thomas Crane

By Johnson & Thacher

Attorneys

T. CRANE,

Assignor to himself and M. A. JONES.

Sewing-Machine.

No. 9,208. Reissued May 18, 1880.

Witnesses

W. C. Corlies

Jno. C. MacGregor.

Inventor

Thomas Crane

By Johnson & Thacher

Attorneys

UNITED STATES PATENT OFFICE.

THOMAS CRANE, OF FORT ATKINSON, WISCONSIN, ASSIGNOR TO HIMSELF AND MELVIN A. JONES.

SEWING-MACHINE.

SPECIFICATION forming part of Reissued Letters Patent No. 9,208, dated May 18, 1880.

Original No. 150,532, dated May 5, 1874. Application for reissue filed December 15, 1879.

*To all whom it may concern:*

Be it known that I, THOMAS CRANE, of Fort Atkinson, in the county of Jefferson and State of Wisconsin, have invented certain new and useful Improvements in Sewing-Machines; and I do hereby declare that the following is a full, clear, and exact description thereof, reference being had to the accompanying drawings, making part of this specification, in which—

Figure 1:
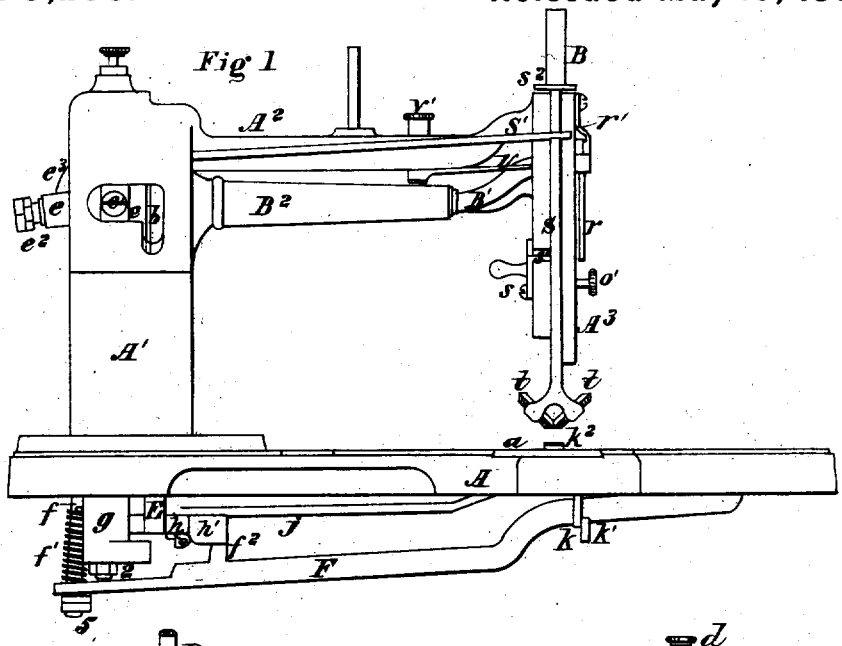
Figure 2:
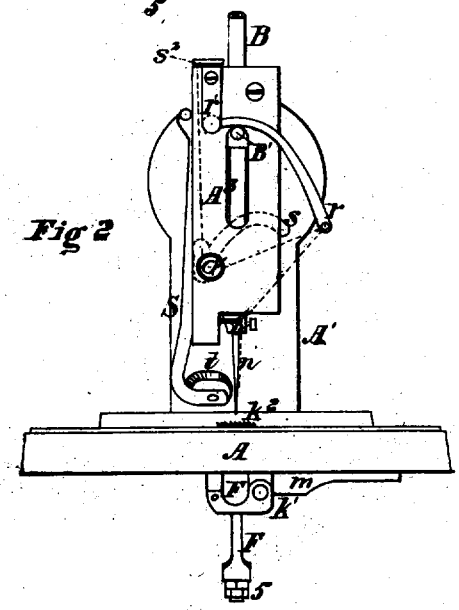
Figure 3:
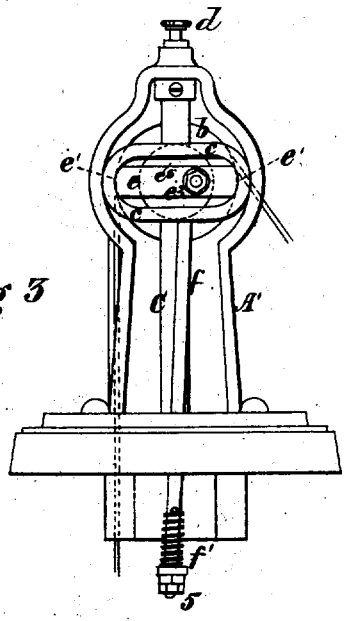
Figure 4:
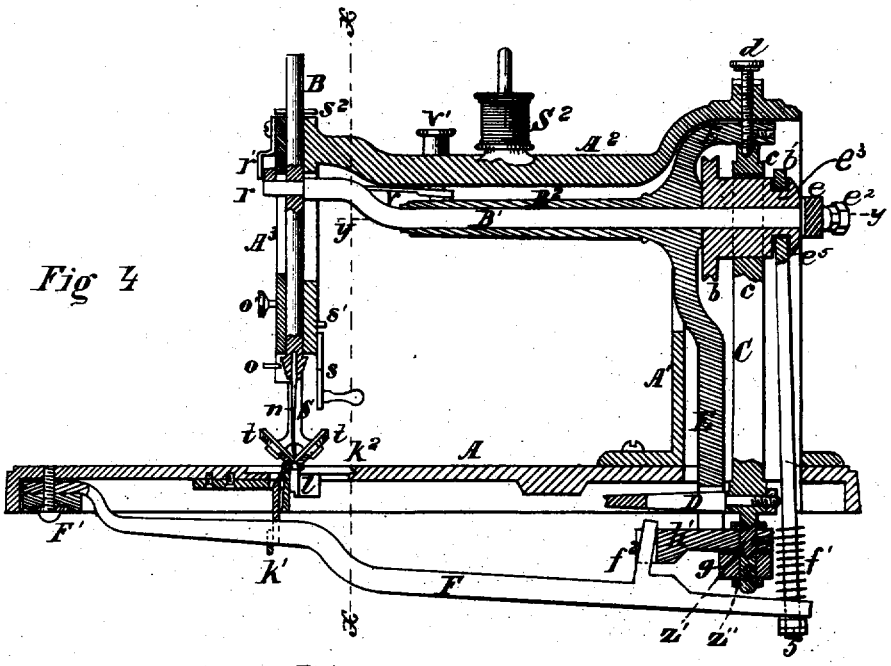
Figure 5:
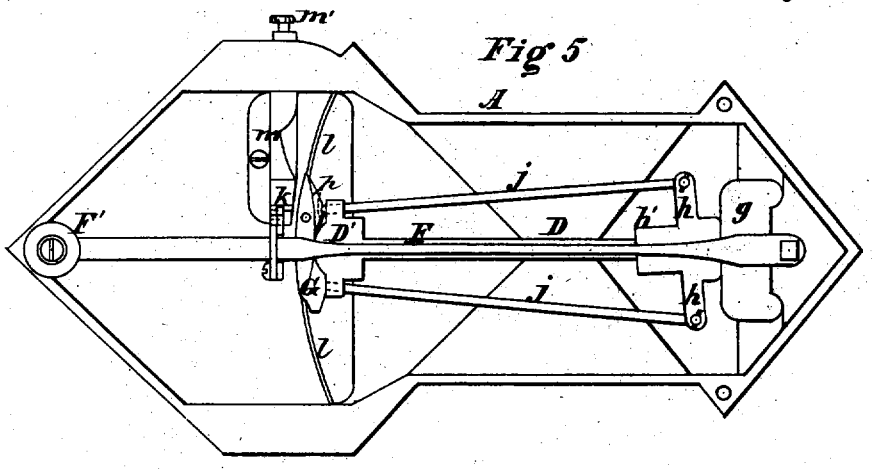
Figure 6:
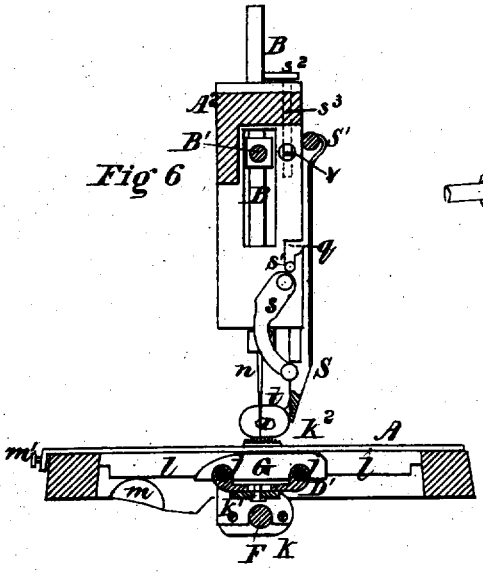
Figure 7:
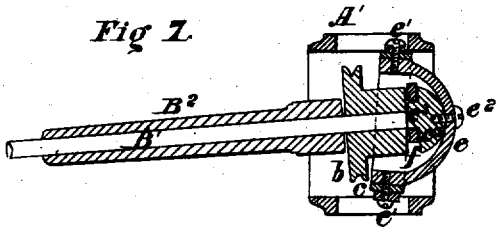
Figure 8:
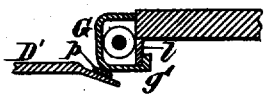
Figure 10:
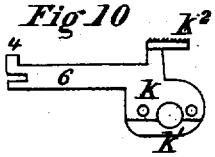
Figure 9:
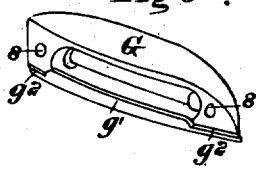
Figure 11:
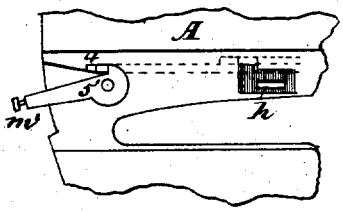
Figure 12:
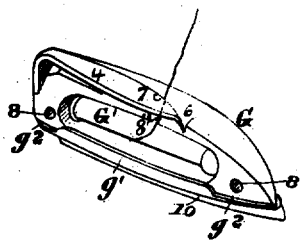
Figure 13:
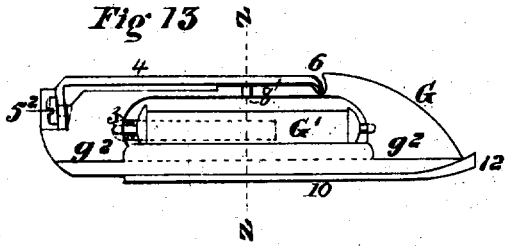
Figure 14:
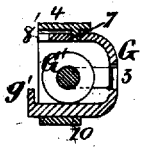
Figure 15:
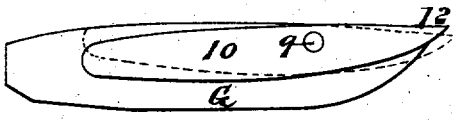

Figure 1 is a view of one side of the machine. Fig. 2 is a front-end view of the machine. Fig. 3 is a view of the rear end of the machine. Fig. 4 is a section taken vertically and longitudinally through the center of the machine. Fig. 5 is a bottom view of the machine. Fig. 6 is a section taken through the machine in the vertical plane indicated by the dotted line *x x* on Fig. 4. Fig. 7 is a section through Fig. 4 in the horizontal plane *y y*. Fig. 8 is a sectional view, showing the shuttle applied to its flanged raceway and carrier. Fig. 9 is a perspective view of a shuttle adapted to the flanged raceway. Figs. 10 and 11 show the cloth-feeder and the means for adjusting it. Fig. 12 shows my improved tension device applied to the flanged shuttle. Fig. 13 is a view of the open side of the shuttle. Fig. 14 is a cross-section through the shuttle in the plane *z z*, Fig. 13. Fig. 15 is a bottom view of the shuttle.

Similar letters of reference indicate corresponding parts in the several figures.

This invention relates to certain novel improvements in shuttle sewing-machines, which I will now describe, so that others skilled in the art may understand the same.

In the accompanying drawings, A represents the cloth-plate, from one end of which rises a hollow standard, A′, constructed with an overhanging arm, $A^2$, from which descends a pendent bracket, $A^3$.

B′ represents the driving-shaft, carrying a belt-pulley, *b*, and an eccentric, $c^3$. This shaft passes through and has its bearing in an arm, $B^2$, formed on the upper portion of a vertical rock-shaft, E, which arm extends nearly as far as the pendent bracket $A^3$. That portion of the driving-shaft B′ which is exposed beyond the free end of the horizontally-vibrating arm $B^2$ is cranked and its end passed through a vertical slot made through the pendent bracket $A^3$ and through the needle-bar B, so that when the shaft B′ is rotated it will impart a rectilinear reciprocating motion to the needle-bar, which is guided by the said pendent bracket $A^3$.

The rock-shaft E is stepped at 2 in a stirrup, *g*, and connected at its upper end to the upper end of the hollow standard A′ by a pivot-screw, *d*. The lower end of this rock-shaft E is constructed with a slotted foot, *h*′, from the sides of which foot extend two arms, *h h*. The slot or notch in the foot *h*′ receives a stud, $f^2$, which rises from a feed-actuating bar, F, that extends forward of the raceway *l* for the shuttle, and is connected by a pivot and spring-cushion or loose joint, F′, to the cloth-plate A, as shown in Figs. 4 and 5. This bar F has the feeder *k* connected to it, as will be hereinafter explained, and it receives a lateral vibrating motion from the foot *h*′. The rear end of the feed-bar receives loosely through it a rod, *f*, having an adjusting-nut, 5, on its lower end, on which nut the bar is held by a spring, *f*′. The rod *f* receives from the eccentric $c^3$ on shaft B′ vertical motion, which imparts vertical vibration to the feed-bar F. Thus it will be seen that the feeder $k^2$ receives the proper movements for feeding the cloth beneath the needle from the rock-shaft E and the cam $c^3$ on the main shaft B. The feeder is serrated and slotted, and formed on a plate, *k*, which is connected to the feed-bar F by means of a pivot-plate, *k*′, as shown in Figs. 1, 2, 4, 5, 6, and 10. The plate *k* has an arm-extension, 6, formed on it, which is guided by a grooved block, *m*, fixed to the bottom of the cloth-plate. The outer extremity of the arm 6 has a tooth, 4, rising from it, which extends through an oblong slot made through the cloth-plate, and plays between one end of this slot and a shoulder which is formed on a pivoted cam-plate, 5′, as shown in Fig. 11. The cam-plate 5′ is adjustable, and can be fixed after it is adjusted by means of a thumb-screw, *m*′, which bears against a curved portion of the edge of the cloth-plate. By adjusting the cam-plate 5′ the strokes of the feeder $k^2$ can be shortened or lengthened.

It will be seen by reference to Fig. 5 that the feed-bar F is made quite thin between the foot $h'$ and the plates $k\,k'$. This is for the purpose of allowing this bar to bend or yield laterally when the feeder $k^2$ is adjusted for short strokes. This renders unnecessary shortening or lengthening the strokes of the foot $h'$ when the feeder is adjusted. If at any time it is found necessary to adjust the vertical strokes of the feeder $k^2$, this can be done by means of the nut 5 on the screw-threaded end of the eccentric-rod $f$.

C represents a vertical rock-shaft supported upon a vertically-adjustable step, $z'$, which is inserted into the foot $h'$ of the shaft E, and tightened by means of a nut, $z''$, as shown in Fig. 4. The upper end of this shaft is steadied by a pivot-screw, $d$, which is tapped through the arm $A^2$ and through the upper curved extension of shaft E. The axes of motion of the two shafts E and C coincide with each other. The upper portion of the shaft C is of an elliptical form, and through this ellipse $c$ the eccentric $e^3$ and its hub pass freely, as shown in Figs. 3 and 4. To the ellipse $c$ a yoke, $e$, is pivoted at $e'\,e'$, which yoke is connected eccentrically to a rounded enlargement on the end of a cam, $e^5$, by a pivot, $e^2$.

When the shaft B′ is rotated by a driving-belt passing over pulley $b$ this shaft B′ and the shaft E will receive a lateral vibrating motion, in consequence of the eccentric attachment $e^2$. At the same time this attachment $e^2$ will cause the said lateral vibrating motion imparted to the shaft B′ to rock the shaft C about its axis.

To the lower end of the rock-shaft C a horizontal arm, D, is rigidly secured, which arm extends forward a suitable distance, and has adjustably secured to it a shuttle-carrier, D′, which receives motion laterally in the arc of a circle. There are two eyes formed on the ends of the shuttle-carrier D′, through which play the ends of two rods, $j\,j$, which rods are connected to the ends of arms $h\,h$ on the foot $h'$, as shown in Fig. 5. The object of the rods $j\,j$ is to hold the shuttle upon its carrier, which they do by alternately entering holes 8 8 made through the shuttle. The shuttle G is guided in its reciprocating movements by means of a flanged raceway, $l$, which is concentric to the axis of the shaft E, and which extends below the bottom surface of the cloth-plate A. The shuttle G presents a convex surface to the vertical surface of the flange $l$, and is held in contact therewith by means of a flange, $g'$, turned up from a shoulder, $g^2$, near the lower edge of the shuttle, as shown in Figs. 8 and 9. The shoulder $g^2$ is held up in contact with the lower edge of the flanged raceway $l$ by means of a spring, $p$, on the carrier D′.

Into the back edge of the bracket $A^3$ is inserted a vertical presser-bar, S, which is held in place by a pin, $s'$, working in a slot, $q$, (shown in Fig. 6,) and which is acted on by a spring, S′, that is so applied as to give a downward and at the same time a lateral pressure. The downward pressure depresses the bar S, and the lateral pressure keeps its upper end in place in its slot.

For the purpose of raising and depressing the bar S, I employ a cam-shaped lever, $s$, which, when turned up, as in Figs. 1 and 2, will act on pin $s'$, and, after raising the bar, will place the pin which is affixed thereto into a concavity at the upper end of slot $q$, in which position of the pin $s'$ the bar S will assume the position shown in Fig. 2—that is to say, the bar will be raised to its fullest extent, and its lower end will be thrown back, as represented in Fig. 2.

The spring-bar S′ serves as the fulcrum upon which the presser-bar turns outward away from the needle and in the line of the feed while it is being raised. The lower end of the bar S is bifurcated, and its prongs bent so as to afford bearings for two beveled and inclined rollers, $t\,t$, the bevel peripheries of which are serrated for biting into the cloth, which is fed beneath the needle $n$ by the movements imparted to the serrated feeder $k^2$. The rollers $t\,t$, as just stated, present serrated edges to the cloth, which edges are brought together or as closely together as possible behind the needle, and the latter is arranged as closely as possible to the centers of the rollers.

Inclined presser-rollers are not new with me; but my arrangement of such rollers with respect to the point where the needle enters the cloth I believe to be new. The advantage of such arrangement is that the pressure is upon the fabric each side of the stitch, and nearly if not quite upon it, while it is being drawn tight, which prevents the rollers from loosening the stitches. The rollers, by coming together in front of the needle, tread upon or so nearly upon the last stitch formed that said stitch is held from relaxing while the next stitch is being formed.

At the upper end of the bracket $A^3$ is a tension-plate, $s^2$, which has a pin, $s^3$, extending down from it into the bracket $A^3$, into which pin a slot is made, which, by means of an opening through the bracket, admits of the reception of one end of a spring, V, the opposite end of which spring is adjustable by means of a nut, $v'$. The plate $s^2$ is arranged directly over the slot in which the presser-bar S is placed, so that when this bar is fully raised its upper end will lift the plate $s^2$ and raise the free end of spring $v$.

When the presser-bar S is depressed the spring V will cause the plate $s^2$ to bear with more or less pressure upon the upper end of the bracket $A^3$, regulated by the nut $v'$, which acts to lift the rear end of the spring V.

The thread (indicated by a dotted line in Fig. 2) is carried from the spool $S^2$ beneath the pressure-plate $s^2$, and downward and around a pin, $o'$, thence upward through an eye which is made through an arm, $r$, and finally through a loop, $o$, to the eye of the needle, as shown in Fig. 2.

The arm $r$ is pivoted to the bracket and held in place by a retainer, $r'$, which allows the perforated end of this arm to be raised and depressed.

By the arrangement of the pressure-plate $s^2$ on top of the bracket $A^3$ and directly over the upper end of the presser-bar S, when the bar is fully raised, as shown in Fig. 1, it will lift the said plate, liberate the tension on the thread, and allow the latter to draw freely while removing the work; and these results are effected simultaneously—that is, the tension on the thread is liberated at the same time that the presser-bar is raised from the material being sewed. The material may then be removed without pulling on the thread, as the latter will run freely from the spool, the tension being removed. When the presser-foot is again dropped to its working position the tension is restored.

The shuttle-case G, Figs. 12, 13, 14, and 15, may be made of any of the well-known forms, with a recess for containing the bobbin G', which latter is held in its bearings by means of a spring, 3, the notched free end of which embraces one of the pivoted ends of the bobbin, as shown in Figs. 13 and 14. Other equivalent means of applying the bobbin may be adopted.

On the top of the case G, I apply a spring tension-plate, 4, which is preferably made of the tapered form shown in Fig. 12, so as to prevent the thread dragging on its edge as the shuttle plays back and forth in or on its raceway. This tension-plate 4 is secured to the butt-end of the shuttle-case by means of a screw, $5^2$; and at 6 the point of the plate 4 is depressed and concealed in a notch or cell made in the shuttle-case, as shown in Fig. 13, for the purpose of preventing the arrest of the thread by it as the shuttle passes through the loop of the thread. In threading the shuttle the thread is drawn laterally under the point of said plate 4. That portion of the plate 4 through which the screw $5^2$ passes is not at right angles to its horizontal portion, but forms with it an acute angle. Consequently by tightening or loosening the screw $5^2$ the pressure or tension on the thread can be nicely adjusted.

At 7 a pin is fixed to the tension-plate 4, which pin enters a hole made through the case G, as shown in Fig. 14, and prevents lateral displacement of plate 4, and also serves for the thread to draw around while drawing the stitch tight.

Into the upper thin edge of the case G a notch, 8', is made, through which the thread from the shuttle is passed. It is in this notch 8' that the thread is held by the tension-plate 4, which covers it.

On the bottom of the case G, I apply, by means of a pivot, 9, a tapered plate, 10, which is adjustable about this pivot, and is held in place by frictional contact with the bottom of case G.

The point 12 of the plate 10 forms the point of the shuttle, and, of course, must run close to the needle, so as to take the loops of thread with certainty. This point 12 can be adjusted by turning said plate on its pivot nearer to or farther from a needle, as may be required, and as this point wears away it can be easily set up, and its proper relation with respect to the needle always maintained. If it is desired not to depend on frictional contact alone for holding the point 12 in place, a set-screw or other suitable means may be employed for positively holding this plate.

I have represented and described in this patent a flanged shuttle and a movable pointed shuttle; but I do not here claim these shuttles specifically.

Having described my invention, what I claim as new, and desire to secure by Letters Patent, is—

1. The combination of the driving-shaft B', rock-shaft E, having the foot $h'$, and also the arm $B^2$, wherein the shaft B' has its bearing, with the feed-actuating bar F, having the stud $f^2$, substantially as described.

2. The yielding feed-actuating bar F and means for vibrating said bar, as described, combined with the feed device $k$ and a feed-adjuster, 5', substantially as described.

3. The combination of the shuttle G, having the holes 8 8, with rock-shaft E, provided with the foot $h'$, having the arms $h$ $h$, and the rods $j$ $j$, which alternately enter and leave the shuttle, substantially as described.

4. The lifting-cam $s$, in combination with the presser-bar S, provided with the pin $s'$, and the bracket $A^3$, provided with the slot $q$, and the spring S', which serves as a fulcrum for the presser-bar, whereby the one cam is enabled to move the pin in two directions simultaneously—viz., both vertically and horizontally away from the needle in line of the feed—substantially as described.

5. The combination, with the presser-bar S, of a tension-plate, $s^2$, its pin $s^3$, depressing spring V, and mechanism for raising and depressing said presser-bar, substantially as described.

6. The shuttle-case G, provided with a notch, 8', in its side, combined with a tension-plate, 4, and a screw, $5^2$, whereby said tension-plate is secured at one end of said shuttle-case, said tension-plate being provided at its outer end with a depressed point, 6, which is concealed in a cell in the shuttle-case, and operating, in connection with the notch 8', as set forth.

7. In a sewing-machine, a tension device, in combination with a presser-bar and a device for raising the presser-bar, whereby the tension is relieved simultaneously with the raising of the presser-foot from the material, substantially as and for the purpose set forth.

8. In a sewing-machine, a tension device, in combination with a presser-bar, a device for lifting the presser-bar, and mechanism arranged between the tension device and the presser-bar lifter, whereby the movement of the lifter is imparted to the tension device to relieve the tension simultaneously with the raising of the presser-bar, substantially as described.

THOMAS CRANE.

Witnesses:
GEO. C. SMITH,
L. S. KELLOGG.